(12) United States Patent
Horspool et al.

(10) Patent No.: US 9,904,490 B2
(45) Date of Patent: Feb. 27, 2018

(54) SOLID-STATE MASS STORAGE DEVICE AND METHOD FOR PERSISTING VOLATILE DATA TO NON-VOLATILE MEDIA

(71) Applicant: Toshiba Memory Corporation, Minato-ku, Tokyo (JP)

(72) Inventors: Nigel David Horspool, Bucks (GB); Jeremy Omar Moore, Bucuresti (RO); Julien Margetts, Thame (GB)

(73) Assignee: Toshiba Memory Corporation, Tokyo (JP)

( * ) Notice: Subject to any disclaimer, the term of this patent is extended or adjusted under 35 U.S.C. 154(b) by 40 days.

(21) Appl. No.: 14/751,444

(22) Filed: Jun. 26, 2015

(65) Prior Publication Data
US 2016/0378337 A1    Dec. 29, 2016

(51) Int. Cl.
*G06F 3/06*    (2006.01)

(52) U.S. Cl.
CPC ............ *G06F 3/0659* (2013.01); *G06F 3/064* (2013.01); *G06F 3/0607* (2013.01); *G06F 3/0616* (2013.01); *G06F 3/0664* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,788,427 B1 * | 8/2010 | Yang | G06F 3/0604 710/29 |
| 8,151,037 B1 * | 4/2012 | Zhou | G06F 12/0246 711/103 |
| 8,151,064 B2 * | 4/2012 | Lee | G06F 3/0625 360/69 |
| 8,533,387 B1 * | 9/2013 | Zhou | G06F 12/0246 711/103 |
| 8,775,711 B2 | 7/2014 | Chung et al. | |
| 8,874,831 B2 | 10/2014 | Lee et al. | |
| 2005/0251617 A1 * | 11/2005 | Sinclair | G06F 3/061 711/103 |

(Continued)

OTHER PUBLICATIONS

An Innodisk White Paper, Using Innodisk's iCell Technology to Prevent Data Loss in SSDs, Jan. 2015.

*Primary Examiner* — Kevin Verbrugge
(74) *Attorney, Agent, or Firm* — White & Case LLP

(57) ABSTRACT

A mass storage device and method for storing data originally written to a volatile memory with byte level I/O protocol commands to a non-volatile memory using block level I/O protocol commands. The mass storage device includes a host interface for communicating with the host computer system, at least one non-volatile memory, at least one volatile memory, a memory controller configured to accept block level I/O protocol commands from the host computer system to read data from and write data to the non-volatile memory, and additionally accept byte level memory I/O commands from the host computer system for reading data from and writing data to the at least one volatile memory, and means for retrieving the data written by the host computer system using the byte level memory I/O commands from the volatile memory and writing the data retrieved from the volatile memory to the at least one non-volatile memory.

21 Claims, 2 Drawing Sheets

(56) References Cited

U.S. PATENT DOCUMENTS

| | | | |
|---|---|---|---|
| 2007/0168607 A1* | 7/2007 | Takai | G06F 12/0866 |
| | | | 711/113 |
| 2007/0288683 A1* | 12/2007 | Panabaker | G06F 12/06 |
| | | | 711/101 |
| 2008/0086589 A1* | 4/2008 | Urabe | G06F 13/1668 |
| | | | 711/103 |
| 2008/0086590 A1* | 4/2008 | Urabe | G06F 13/4256 |
| | | | 711/103 |
| 2008/0155185 A1* | 6/2008 | Kim | G11C 14/0018 |
| | | | 711/104 |
| 2009/0313416 A1* | 12/2009 | Nation | G06F 12/0638 |
| | | | 711/100 |
| 2011/0047438 A1* | 2/2011 | Lin | G06F 12/0868 |
| | | | 714/758 |
| 2012/0124276 A1* | 5/2012 | Ahn | G06F 12/0246 |
| | | | 711/103 |
| 2013/0086309 A1* | 4/2013 | Lee | G06F 12/0246 |
| | | | 711/103 |
| 2014/0129765 A1 | 5/2014 | Cho | |
| 2014/0281661 A1* | 9/2014 | Milton | G06F 11/1458 |
| | | | 714/2 |
| 2015/0355846 A1* | 12/2015 | Uematsu | G11C 5/04 |
| | | | 711/103 |

* cited by examiner

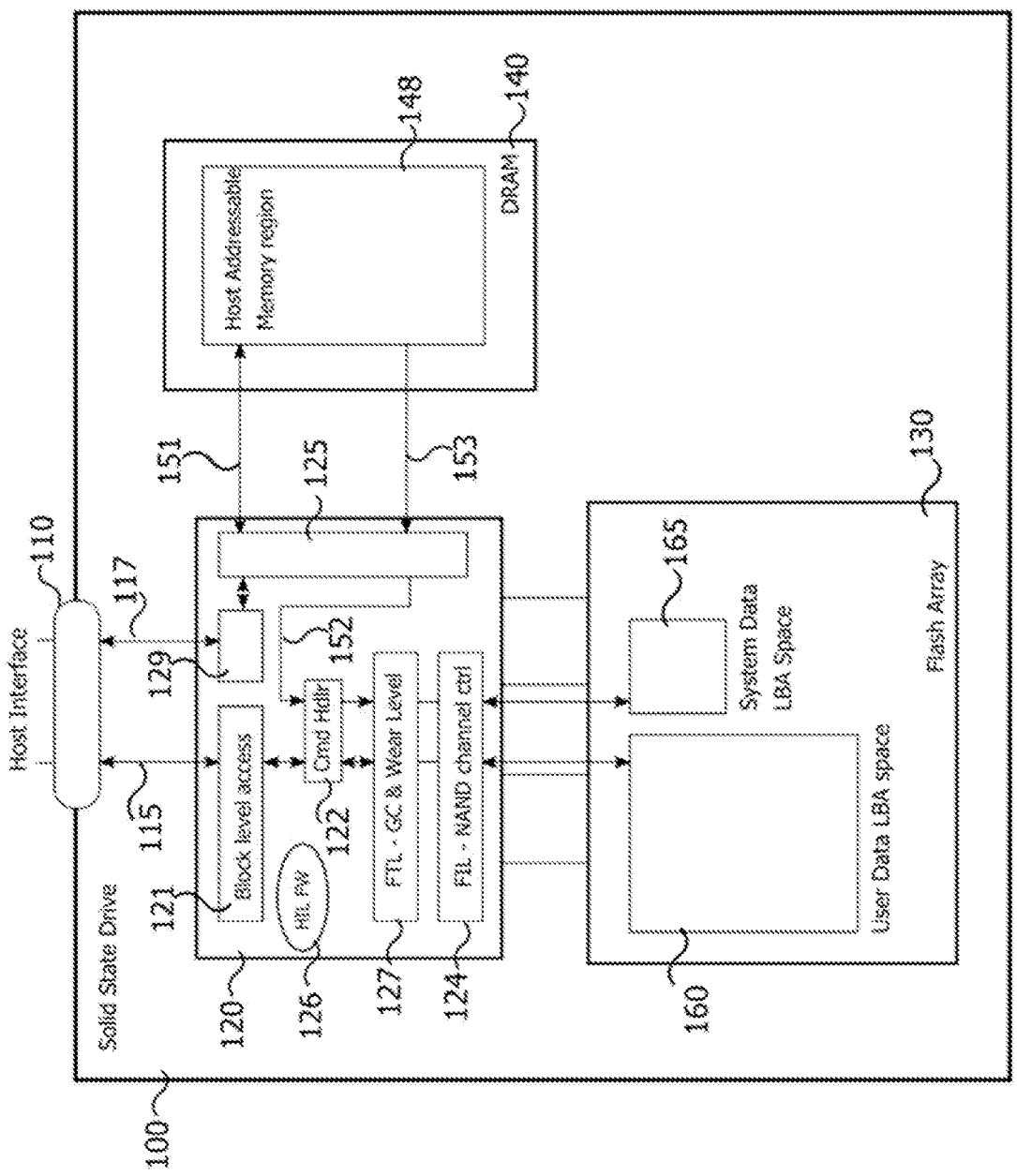

SOLID-STATE MASS STORAGE DEVICE AND METHOD FOR PERSISTING VOLATILE DATA TO NON-VOLATILE MEDIA

BACKGROUND OF THE INVENTION

The present invention generally relates to memory devices for use with computers and other processing apparatuses. More particularly, this invention relates to solid-state mass storage drives and methods suitable for writing data to a volatile memory on a solid-state drive with non-block level I/O protocol commands, and persisting the data written to the volatile memory to a non-volatile memory on the solid-state drive using virtual or simulated block level I/O protocol commands.

Non-volatile solid-state memory technologies used with computers and other processing apparatuses (host computer systems) are currently largely focused on NAND flash memory technologies, with other emerging non-volatile solid-state memory technologies including phase change memory (PCM), resistive random access memory (RRAM), magnetoresistive random access memory (MRAM), ferromagnetic random access memory (FRAM), organic memories, and nanotechnology based storage media such as carbon nanofiber/nanotube-based substrates. These and other non-volatile solid-state memory technologies will be collectively referred to herein as solid-state mass storage media. Mainly for cost reasons, at present the most common solid-state memory technology used in solid-state drives (SSDs) are NAND flash memory components, commonly referred to as flash-based memory devices, flash-based storage devices, flash-based media, or raw flash.

Briefly, flash memory components store information in an array of floating-gate transistors, referred to as cells. The cell of a NAND flash memory component has a top gate (TG) and a floating gate (FG), the latter being sandwiched between the top gate and the channel of the cell. The floating gate is separated from the channel by a layer of tunnel oxide. Data are stored in (written to) a NAND flash cell in the form of a charge on the floating gate which, in turn, defines the channel properties of the NAND flash cell by either augmenting or opposing a charge on the top gate. This charge on the floating gate is achieved by applying a programming voltage to the top gate. Data are erased from a NAND flash cell by applying an erase voltage to the device substrate, which then pulls electrons from the floating gate. The charging (programming) of the floating gate is unidirectional, that is, programming can only inject electrons into the floating gate, but not release them.

NAND flash cells are organized in what are commonly referred to as pages, which in turn are organized in what are referred to as memory blocks (or sectors). Each block is a predetermined section of the NAND flash memory component. A NAND flash memory component allows data to be stored and retrieved on a page-by-page basis and erased on a block-by-block basis. For example, erasing cells is described above as involving the application of a positive voltage to the device substrate, which does not allow isolation of individual cells or even pages, but must be done on a per block basis. As a result, the minimum erasable size is an entire block, and erasing must be done every time a cell is being re-written.

In order to map a storage space of an SSD from a block level protocol viewpoint onto a physical flash storage array, the SSD presents a number of storage sectors, each sector contains typically 512 Bytes or 4096 Bytes, that may be accessed by a host computer system via an address called the Logical Block Address (LBA). A write or read command received from the host in the block level protocol identifies a start sector LBA and a number of sectors to transfer. Although a page of data is the smallest amount of data that can be written to the flash device, a page can only be written after a complete block (referred to herein as an erase block) containing that page of data has been erased. Unlike many other types of storage media, the flash storage array has a limited lifetime for each erase block, both in terms of a number of times it may be erased and re-written, that is, programmed, giving rise to a measure of Program/Erase (P/E) cycles, as well as in terms of a period of time the erase block will retain the data, that is, the retention period, where over time the programmed electrical charge will leak so that data may be lost.

To solve these issues and ensure that many writes to the same LBA by the host (for example, due to many modifications by the host to the same file on the SSD) do not prematurely wear out a single erase block, a Flash Translation Layer (FTL) function is used by the flash controller. This virtualizes the flash storage elements where the LBA used by the host is mapped to a physical address on the flash devices, but where this mapping can change each time the LBA is written to by the host. This mapping means that any sector of host data can in principle be mapped to any flash storage element. In addition, by using dynamic mapping from host LBAs to physical addresses, it can be ensured that each flash storage element is programmed at a similar rate, a function known as wear-leveling. As the drive is progressively used, some host LBAs are over-written or become unused (when a host filesystem deletes a file it generally marks the LBA as unused, to be re-used later), which means that some of the data in the flash storage array is no longer required—whereby a flash block may contain a mixture of valid and invalid data in its pages.

To enable the re-use of pages with invalid data, the FTL runs software called garbage collection which copies the valid data pages from blocks containing invalid data pages to fresh, erased blocks, thereby invalidating all the data pages in the original blocks and allowing them to be erased. This de-fragments the valid data pages, bringing them together in blocks containing only valid data pages and as a by-product creating additional erased blocks from the original fragmented blocks with valid and invalid pages that can be used to store new host write data. The FTL uses complex algorithms to decide which blocks should be candidates for the next garbage collection, based on the amount of valid data in a block, the number of times a block has been programmed, etc. As can be seen, the FTL has to perform many complex functions to store the host data efficiently.

While an SSD using flash memory offers many advantages over other mass storage media like hard disk drives, such as increased speed of read and write access, it is still much slower in operation than dynamic RAM (DRAM) technology used as main system memory in computer systems. Applications such as In-Memory Databases (IMDBs), make extensive use of the host computer DRAM to achieve the required high speed data throughputs, to the extent that the complete database is held in fast DRAM (hence their name) in order to provide the fastest possible database processing throughputs. A database may easily extend to several gigabytes in size and while the cost of DRAM has reduced in recent times, the provision of DRAM storage in Gigabyte quantities is still much more expensive when compared to NAND flash based SSD storage.

The amount of DRAM available to an IMDB is therefore constrained largely by cost, and once the DRAM capacity is reached, or if the data is required for later reference or further processing while still continuing to process new data in the meantime, the DRAM contents may be required to be 'paged out' to mass storage such as an SSD or HDD. DRAM is also volatile, meaning it may be required to be kept powered up by backup power supplies lest it be lost in the event of a power failure, whereas NAND flash memory is non-volatile and therefore can retain, or persist, data that is stored even if a power failure is experienced.

In view of the above, it can be appreciated that there are certain problems, shortcomings or disadvantages associated with the prior art, and that it would be desirable if a solid-state mass storage device and method for persisting volatile data located on a solid-state mass storage device to a nonvolatile memory device also located on the solid-state mass storage device were available.

BRIEF DESCRIPTION OF THE INVENTION

The present invention provides mass storage devices and methods suitable for storing and persisting a mass storage device's memory controller system data (being host system data directly written to the storage device using memory I/O commands, referred to hereinafter as system data), metadata, or other data originally written to a volatile memory with non-block level I/O protocol commands, to a non-volatile memory using virtual or simulated block level I/O protocol commands.

According to one aspect of the invention, a mass storage device configured for use with a host computer system and for storing data thereof includes a host interface for communicating with the host computer system, at least one non-volatile memory, at least one volatile memory, a memory controller configured to accept block level I/O protocol commands from the host computer system to read data from and write data to the non-volatile memory, and additionally accept byte level memory I/O commands from the host computer system for reading data from and writing data to the at least one volatile memory, and means for retrieving the data written by the host computer system using the byte level memory I/O commands from the volatile memory and for writing the data retrieved from the volatile memory to the at least one non-volatile memory.

According to another aspect of the invention, a method of storing data received from a host computer system on a mass storage device includes receiving a byte level memory I/O command from the host computer system wherein the byte level memory I/O command includes the data, writing the data to a volatile memory of the mass storage device, retrieving the data from the volatile memory, and then writing the data retrieved from the volatile memory to the at least one non-volatile memory.

A technical effect of the invention is the ability to write data to a solid state drive using fast byte-oriented memory I/O commands to a volatile memory and to backup and/or store this data in a persistent form to a non-volatile memory using block level I/O protocol commands.

Other aspects and advantages of this invention will be better appreciated from the following detailed description.

BRIEF DESCRIPTION OF THE DRAWINGS

FIG. 2 represents processing of write commands in the solid-state drive of FIG. 1.

DETAILED DESCRIPTION OF THE INVENTION

Figure 1:
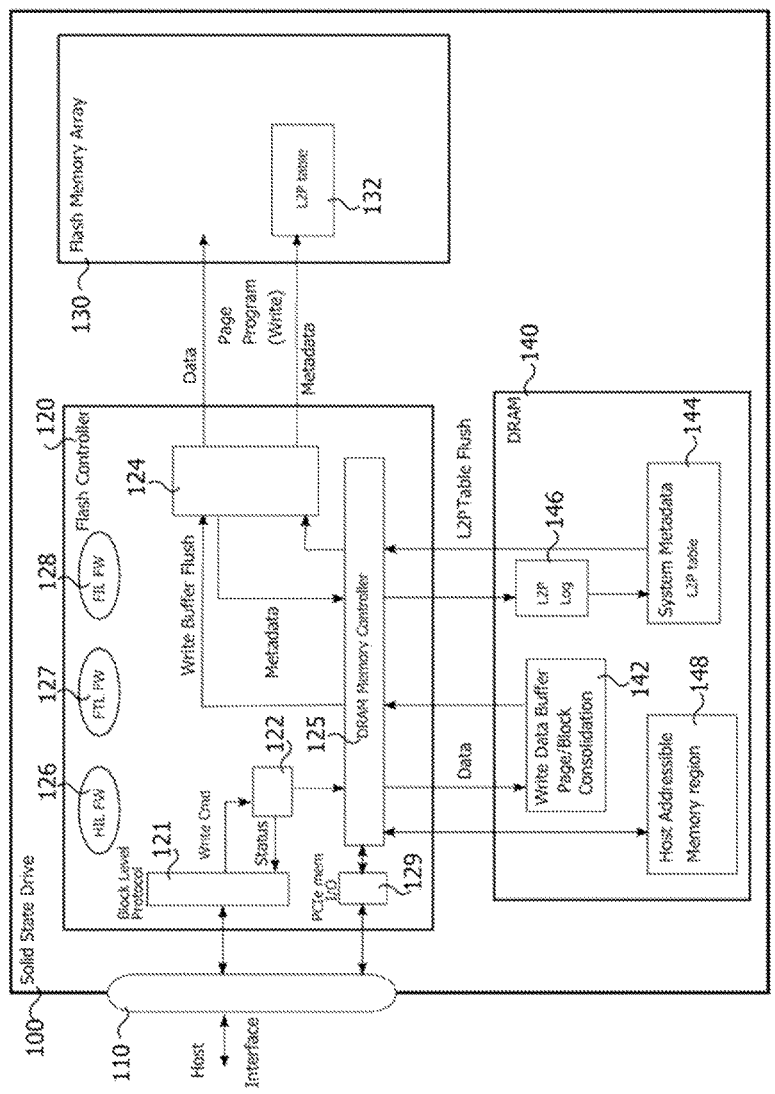
FIG. 1 represents a solid-state drive in accordance with an aspect of the present invention.

The present invention provides systems and methods for writing data to a volatile memory and for copying the data stored in the volatile memory to a nonvolatile memory. In particular, aspects of the present invention provide for backup and/or persistence of volatile memory on a non-volatile mass storage device. A nonlimiting example discussed in detail hereinafter includes saving data from a local DRAM to a NAND flash memory array on a solid-state drive (SSD). It is foreseeable that aspects of the invention may be used to save data from other types of local volatile memory, or to other types of nonvolatile memory. Although the following description focuses on storing and persisting data received by the mass storage device's memory controller from the host system, it will be understood by those in the art that the invention is equally applicable to the storing and persisting of metadata or any other type of data originally written to a volatile memory, and data received from the host system is merely used herein as a nonlimiting example.

FIG. 1 represents a system schematic of an SSD 100 in accordance with an aspect of the invention. The SSD 100 includes a host interface 110 (in this nonlimiting instance, a PCIe bus) for communicating with a host computer system (not shown), a volatile memory 140 (in this nonlimiting instance, DRAM), and a non-volatile memory array 130 (in this nonlimiting instance, a NAND flash-based memory array). The host interface 110 provides direct access to the volatile memory 140 (DRAM) via fast, byte-oriented memory I/O commands (in this nonlimiting instance, PCIe memory mapped I/O commands) and also provides direct access to the non-volatile memory array 130 via block level I/O protocol commands (such as SATA/SCSI, or NVMe protocols). In addition, the volatile memory 140 may be used, at least in part, as a buffer for data that is intended to be written to the non-volatile memory array 130. The SSD 100 further includes a flash memory controller 120 suitable for reading data from and writing data to both the volatile memory 140 and the non-volatile memory 130. A command set of the block level protocol is handled by a front end PCIe function 121. A write command is represented as being received by the controller 120 from the host computer system at the front end PCIe function 121 and passed to a command handler 122 configured to receive one or more commands from a file system or application and provide communication with the host platform's operating system. The command and accompanying data is written to a write buffer 142 of the volatile memory 140, via a volatile (DRAM) memory controller 125 using DRAM protocol. At this point, a completion status of the command is immediately returned by the command handler 122 to the host computer system via the front end PCIe function 121. This process is controlled by a Front End-Host Interface Layer (HIL) processor and firmware 126.

Subsequently, the write buffer 142 of the volatile memory 140 is flushed (a process controlled by the Flash Translation Layer (FTL) processor and firmware 127) and the NAND channel controller 124 of the memory controller 120 issues memory page program commands to the NAND flash-based memory array 130 in flash memory protocol. The NAND channel controller 124 is controlled by a Back End Flash Interface Layer (FIL) processor and firmware 128. Notably, a single write command from the host computer system may result in the programming of multiple pages in multiple NAND flash memory components and/or dies within the memory array 130. When the memory page program commands have completed, metadata (including the physical locations corresponding to the logical locations that the host computer system command specified) is written to a Logical to Physical (L2P) log 146 in the volatile memory 140. The L2P log 146 is used to update an L2P table copy 144 held in the volatile memory 140. The L2P table copy 144 comprises metadata entries identifying the logical to physical locations of the data in the memory array 130.

FIG. 1 further represents an additional PCIe function in accordance with an aspect of the invention which exposes a part of the volatile memory 140 to the host computer system via a second PCIe function 129 using PCIe memory mapped access protocols. Alternatively, another PCIe Base Address Register (BAR) of the front end PCIe function 121 could be used to provide the host access to the volatile memory 140. This additional function allows the host to use non-block (byte) level memory I/O commands to read and write data directly from and to the Host Addressable Memory region 148 of the volatile memory 140 attached to the flash controller 120.

FIG. 2 represents the host interface 110 of the SSD 100 as configured to support direct memory read/write commands 117 from the host computer system to the PCIe function 129. Upon receiving the commands 117, the PCIe function 129 maps the commands 117 via the DRAM memory controller 125 to read/write commands 151 and sends the commands 151 to the Host Addressable Memory region 148 of the DRAM 140. In this way, data may be freely written to and read from the DRAM 140 by the host computer system. However, being volatile, any data so written will be lost in the event of a power failure or system shutdown by the host computer system. In addition to this secondary function, the SSD 100 still functions as a mass storage device and data can be written and read from the memory array 130 by the host computer system using block level I/O commands 115 where the SSD 100 is presented to the host computer system as a regular mass storage device such as a hard disk drive. Although, these block level I/O commands provide a much slower data transfer speed than the direct memory read/write commands 117, they have the advantage that the data is written to persistent non-volatile memory, that is, the memory array 130.

The host performs the direct memory read/write processes without having to employ any block level I/O commands passing through the block level protocol function 121 and command handler 122 (for write commands; a similar command handler, not shown, exists for read commands). The PCIe function 129 interfaces directly to the volatile memory 140 via the DRAM memory controller 125. Data written to the volatile memory 140 with the non-block (byte) level memory I/O commands directly from the host to the host addressable memory region 148, referred to hereinafter as system data, may be subject to loss in an event of power failure, or it may be desirable to save the system data at shut down or during normal operation of the SSD 100. However, the non-block level memory I/O commands do not have a normal logical block address or headers required for saving the system data in the manner in which user data, that is, data saved using block level I/O protocol commands, is saved to the memory array 130. Therefore, the system data may not be directly flushed from the host addressable memory region 148 to the memory array 130.

One approach to copying the system data from the host addressable memory region 148 to the memory array 130 is for one or more physical blocks of flash in the memory array 130 to be allocated for the specific purpose of saving the system data. Due to the system data having been originally written to the volatile memory 140 by non-block level commands, this method may employ a separate mechanism to directly write the contents of the volatile memory 140 to NAND pages in the one or more dedicated blocks (the number being dependent on the size of the host addressable memory region 148) on a single NAND device within the memory array 130.

Generally, the volatile memory in an SSD will be about on the order of $\frac{1}{1,000}$ of the size of the nonvolatile memory (local volatile memory size is dictated largely by the need to have the logical to physical mapping table cached in the volatile memory). Therefore, a representative SSD having a 512 GB nonvolatile flash memory array may have a local 512 MB DRAM, of which perhaps only half (256 MB) is available for direct writing by the host computer system. However, 256 MB of data will easily fit into a single die of flash memory in the memory array (for 64/128 Gb or 8/16 GB, there may be up to 16 dies packaged within a single NAND flash chip).

A backup of the system data may only need to occur occasionally from time to time while the SSD 100 is powered up, as required by an application using direct writing to the volatile memory 140, or when the SSD 100 shuts down when the host shuts down normally or abnormally following a power failure. Therefore, the simplest and most expedient solution would likely be to pre-allocate, for example, one die for backup of the host addressable memory region 148.

One limiting factor of this approach is the inherent characteristics of NAND flash memory, including the technology's P/E (Program/Erase) cycle limits and bad block management requirements. Regarding P/E limits, each time a page is re-written, the page has to be erased first, then programmed (written) with new data. As examples, multi-level cell (MLC) flash may be limited to about 3,000 P/E cycles, and triple-level cell (TLC) flash to only about 1,000 P/E cycles, before the error rates start to rise, eventually making the page unusable. A single page cannot be erased, but a whole block, that is, an erase block, of pages must be erased at the same time. In a page having 16 KB, there may be 512 pages per erase block, or 8 MB per erase block. As such, 256 MB of volatile memory 140 may fit into 32 erase blocks of the volatile memory 130, with plenty more erase blocks in the die still being available.

The flash controller 120 employs wear leveling when mapping or remapping logical to physical addresses to ensure that all physical addresses used are spread equally through the memory array 130. If a fixed mapping was used, logical addresses that were more frequently re-written than others would result in certain physical addresses being program/erased more frequently than others. Wear leveling promotes that all physical addresses are worn evenly with the same average P/E ratio. Also occasionally, flash blocks fail, that is, go 'bad,' and may no longer erase correctly. Such blocks are marked as bad and never used again. In fact, a flash die may have a certain number of bad blocks when manufactured and a bad block list recorded in the die, which may be added to as blocks go bad during subsequent use.

If the above approach of dedicating specific blocks for backup of the host addressable memory region 148 is used, it is foreseeable that the software would most likely have to treat the system data stored in the memory array 130 from the host addressable memory region 148 differently from the data that was stored in the memory array 130 with block level host write commands. For example, the allocated blocks would need different methods of wear leveling, bad block management, garbage collection, and potentially die-level RAID protection, compared to the rest of the memory array 130. Even if the same techniques and algorithms were employed for both the allocated blocks and the rest of the memory array, there would require additional verification of firmware and likely the allocated blocks would be programmed at a different rate from the rest of the memory array. If the dedicated blocks wore out or went bad, saving the system data from the host addressable memory region 148 to the memory array 130 may be more difficult or even impossible.

As an alternative to the above approach, and in accordance with an aspect of the invention, backup of the system data in the host addressable memory region 148 may be performed by dedicating a virtual LBA area in the memory array 130, rather than physical blocks in the memory array 130. By using the allocated LBA area and virtual or simulated block storage commands, the system data may be saved in the memory array 130, and once stored therein, be included in the garbage collection and wear leveling handled by the flash translation layer (FTL) automatically with the rest of the data on the memory array 130. As such, vendor specific commands may be used to enable backup on demand and/or incremental backup of the host addressable memory region 148. Accordingly, the amount of block addressable storage presented to the host and the LBA range available to the user, that is, a maximum user space LBA, may be reduced by the size of the host addressable memory region 148. For clarity, the maximum user space LBA shall be referred to herein as an LBA_MAX.

As an example, FIG. 2 represents a vendor specific block level I/O protocol command 115 as defined and delivered to the flash controller 120 in order to perform backup (or persistence) of the host addressable memory region 148 in DRAM 140 into the non-volatile flash array 130. It is within the scope of the invention that the vendor specific command may define a starting address and size/length of a sub-region in the host addressable memory region 148 in order to flush less than the entire host addressable memory region 148.

Following the vendor specific command 115 requesting a backup or persistence of the system data previously written to the DRAM 140, or following detection by the flash controller 120 of a host power failure, the HIL firmware 126 will preferably create a virtual host write command (or multiple commands) in the command handler 122 that will have a starting LBA address and length of transfer (size). For example, a start address of a portion of the logical address space of the memory array 130 which is an LBA space reserved for backup and/or persistence of the host addressable memory region 148, that is, System Data LBA space 165, as distinct from an LBA address space reserved for data saved with host write commands, that is, a User Data LBA space 160, may be expressed as $$LBA\_START = LBA - LBA\_MAX$$

where LBA is the total number of LBAs of the system, LBA_MAX is the maximum number of user space LBAs, and LBA_START is the start address of the system data LBA space 165 (measured from 0 as the first LBA address). Different starting LBA addresses may be chosen up to LBA−1, which would be the last sector of the system data LBA space 165. This virtual host command will retrieve the data 153 from the Host Addressable memory region 148 (a sub-region may be specified in additional parameters of the vendor specific command) of the DRAM 140 and may then be passed 152 to the command handler 122. From this point, the virtual host write command may be handled in exactly the same manner as any block level command which originated from the host. As such, all of the system data to be backed up or persisted is preferably handled in exactly the same way as user data stored in the user data LBA space 160, so that garbage collection and wear leveling of this data 153 will be handled in exactly the same way and no extra software is required to keep track of separate garbage collection and wear leveling processes for this system data.

In view of the above, it will be understood that this method allows for the system data to be backed up or persisted with very little change or no change to the FTL in order to support the vendor specific commands, and since the system data is presented with virtual LBAs, all wear-leveling, garbage collection, die-level failure RAID support, and other such processes will be implemented automatically. In particular, solid-state mass storage devices in accordance with certain aspects of the invention provide a cost effective storage device that can operate as persistent, non-volatile block-oriented mass storage and also operate as a fast, byte-level accessed memory like host system DRAM, but where the DRAM contents could be quickly made persistent and non-volatile in the event of a power failure, or as required or directed by the computer system application.

While the invention has been described in terms of specific embodiments, it is apparent that other forms could be adopted by one skilled in the art. For example, the physical configuration of the SSD 100 could differ from that shown, other storage media may be used for the volatile memory 140, the non-volatile memory 130, or both, and processes other than those noted could be used. Therefore, the scope of the invention is to be limited only by the following claims.

The invention claimed is:

1. A mass storage device configured for use with a host computer system and for storing data thereof, the mass storage device comprising:
   a host interface for communicating with the host computer system;
   at least one non-volatile memory;
   at least one volatile memory; and
   a memory controller configured to:
      accept block level I/O protocol commands from the host computer system to read data from and write data to the non-volatile memory,
      accept byte level memory I/O commands from the host computer system for reading data from and writing data to the at least one volatile memory, and
      retrieve data written by the host computer system using the byte level memory I/O commands from the volatile memory and write the data retrieved from the volatile memory to the at least one non-volatile memory,
   wherein the block level memory I/O protocol commands are SATA, SCSI or NVMe protocol commands.

2. The mass storage device of claim 1, wherein a region of the volatile memory is allocated for storing the data written by the host computer system using the byte level memory I/O commands.

3. The mass storage device of claim 1, wherein the at least one nonvolatile memory is organized with logical block addresses including a subset of the logical block addresses dedicated to storing the data retrieved from the volatile memory, the subset of logical block addresses being less than all of the logical block addresses.

4. The mass storage device of claim 2, wherein the memory controller is configured to retrieve the data from the region of the volatile memory allocated for storing data written by the host computer system using the byte level memory mapped I/O commands.

5. The mass storage device of claim 1, wherein the memory controller is configured to initiate retrieval of the data written by the host computer system using the byte level memory I/O commands from the volatile memory and writing of the data retrieved from the volatile memory to the nonvolatile memory upon receiving a vendor specific block level I/O command containing a memory address and length indicating the location and size of the data in the volatile memory.

6. The mass storage device of claim 1, wherein the memory controller is configured to initiate retrieval of data written by the host computer system using the byte level memory I/O commands from the volatile memory and writing of the data retrieved from the volatile memory to the nonvolatile memory upon detection of a failure of power being supplied to the mass storage device.

7. The mass storage device of claim 1, further comprising a host interface layer in the memory controller, the host interface layer configured to create a virtual or simulated host write command for writing the data retrieved from the volatile memory to the nonvolatile memory, the virtual or simulated host write command comprising a size of the data written by the host computer system using the byte level memory I/O commands, a starting logical block address indicating a first address at which the data retrieved from the volatile memory is to be written in the at least one non-volatile memory, and a memory address indicating where the data written by the host computer system using the byte level memory I/O commands is located in the volatile memory.

8. The mass storage device of claim 7, wherein the virtual or simulated host write command is indistinguishable to the memory controller from a block level I/O protocol write command received from the host computer system.

9. The mass storage device of claim 1, wherein the memory controller includes a flash translation layer configured for performing garbage collection and wear leveling functions on the at least one non-volatile memory, and the flash translation layer treats all data, including data retrieved from the volatile memory, written to the non-volatile memory the same when performing the garbage collection and wear leveling functions.

10. The mass storage device of claim 1, wherein the byte level memory I/O commands are PCie memory I/O commands.

11. A method of storing data received from a host computer system on a mass storage device comprising a volatile memory and a non-volatile memory, the method comprising:
receiving a block level memory I/O command from the host computer system, the block level memory I/O command including first data from the host computer system;
writing the first data to the non-volatile memory of the mass storage device;
receiving a byte level memory I/O command from the host computer system, the byte level memory I/O command including second data from the host computer system;
writing the second data to a volatile memory of the mass storage device;
retrieving the second data from the volatile memory; and
writing the second data retrieved from the volatile memory to the non-volatile memory,
wherein the method further comprises creating a virtual or simulated host write command in a block level I/O protocol prior to retrieving the data from the volatile memory, the virtual or simulated host write command being configured for writing the data retrieved from the volatile memory to the nonvolatile memory, and
wherein the block level memory I/O protocol command is a SATA, SCSI or NVMe protocol command.

12. The method of claim 11, further comprising assigning the data retrieved from the volatile memory to a subset of logical block addresses of the non-volatile memory, the subset being dedicated to storing the data retrieved from the volatile memory.

13. The method of claim 11, wherein a region of the volatile memory is allocated for storing the second data received with the byte level memory I/O command and retrieving the second data from the volatile memory includes retrieving the data from the region of the volatile memory.

14. The method of claim 11, further comprising receiving a vendor specific block level I/O command comprising a memory address and size indicating where the second data received with the byte level memory I/O command is located in the volatile memory prior to retrieving the second data from the volatile memory.

15. The method of claim 11, further comprising detecting a failure of the power being supplied to the mass storage device prior to retrieving the second data from the volatile memory.

16. The method of claim 11, wherein the virtual host write command comprising a size of the second data written in the volatile memory, a starting logical block address indicating a first address at which the second data retrieved from the volatile memory is to be written in the at least one non-volatile memory, and a memory address indicating where the second data written in the volatile memory is located in the volatile memory.

17. The method of claim 16, wherein creating the virtual or simulated host write command includes making the virtual or simulated host write command indistinguishable from a block level I/O protocol write command received from the host computer system.

18. The method of claim 11, further comprising performing garbage collection and wear leveling processes on the non-volatile memory, wherein the garbage collection and wear leveling processes treat the second data retrieved from the volatile memory and written to the non-volatile memory the same as second data received from the host using block level I/O commands and stored on the nonvolatile memory.

19. The method of claim 11, wherein the byte level memory I/O command is a PCie memory I/O command.

20. The mass storage device of claim 1, wherein the non-volatile memory comprises flash memory, and wherein the controller is configured to access the flash memory by issuing memory page commands.

21. The method of claim 11, wherein the non-volatile memory comprises flash memory, and wherein the method further comprises issuing memory page commands to access the flash memory.

* * * * *